(12) United States Patent
Lauchner

(10) Patent No.: US 6,709,212 B1
(45) Date of Patent: Mar. 23, 2004

(54) TOGGLING FASTENING DEVICE

(75) Inventor: Craig Lauchner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/236,526

(22) Filed: Sep. 5, 2002

(51) Int. Cl.⁷ ............................ F16B 19/00; F16B 21/00
(52) U.S. Cl. ................... 411/342; 411/345; 411/551; 411/913
(58) Field of Search ................. 411/340, 342, 411/344, 345, 508, 509, 551, 913

(56) References Cited

U.S. PATENT DOCUMENTS 2,132,284 A * 10/1938 Bonham .................. 411/342
3,466,965 A * 9/1969 McCarthy ................ 411/342
4,822,226 A * 4/1989 Kennedy ............... 411/340 X
5,904,462 A * 5/1999 Gonzalez ................ 411/342

FOREIGN PATENT DOCUMENTS

DE           2341708    * 8/1974 ............... 411/342

* cited by examiner

Primary Examiner—Neill Wilson

(57) ABSTRACT

A fastening device is disclosed, which has a slotted shaft, a toggling mechanism, which deploys from within the slotted shaft, and which is adapted to couple the slotted shaft to a supporting structure, a detent mechanism disposed about the slotted shaft to deter its rotation, and a tightening mechanism adapted to couple to the shaft. The tightening mechanism binds the fastening device securely in place.

17 Claims, 9 Drawing Sheets

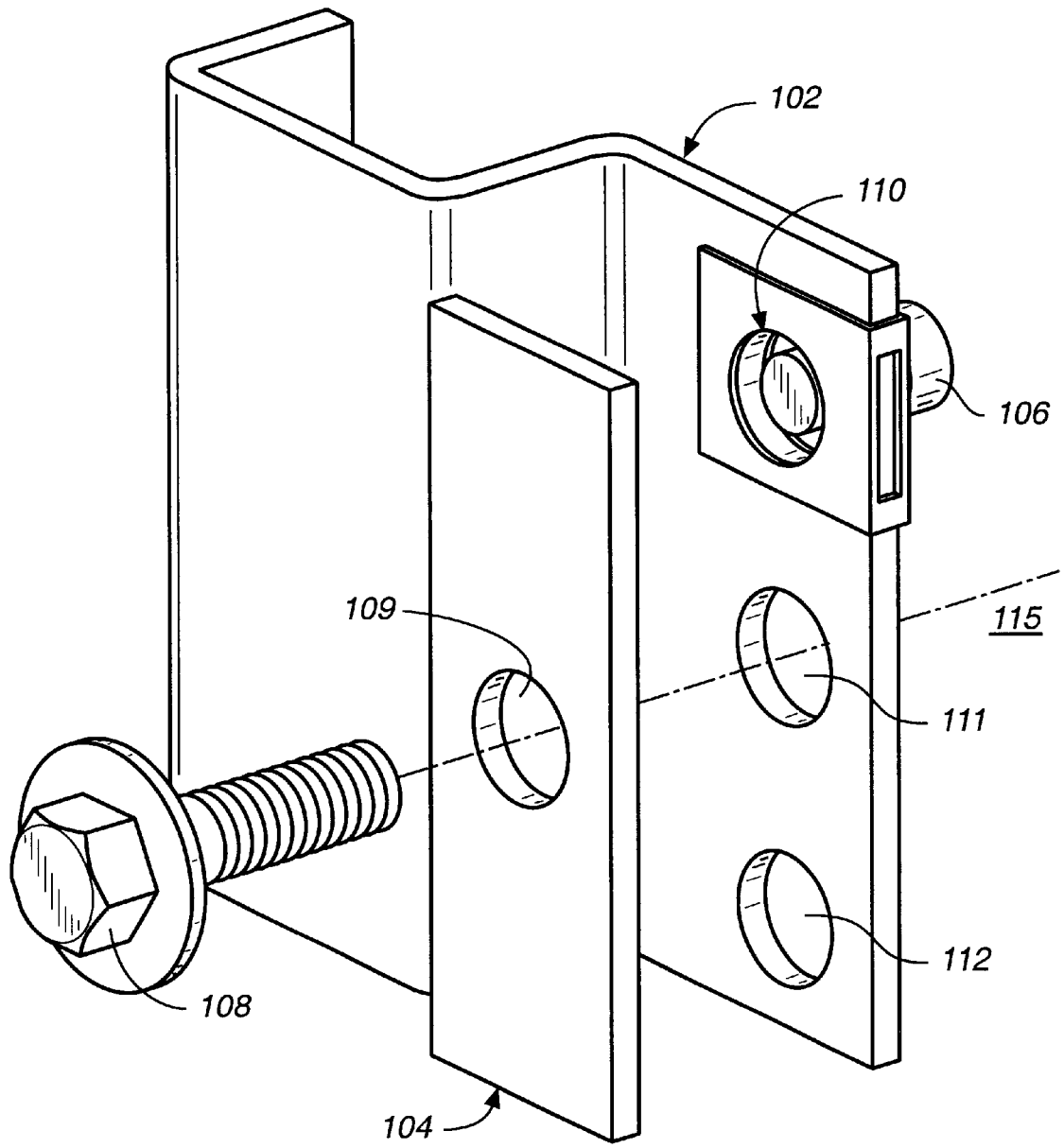
FIG._1
*(PRIOR ART)*

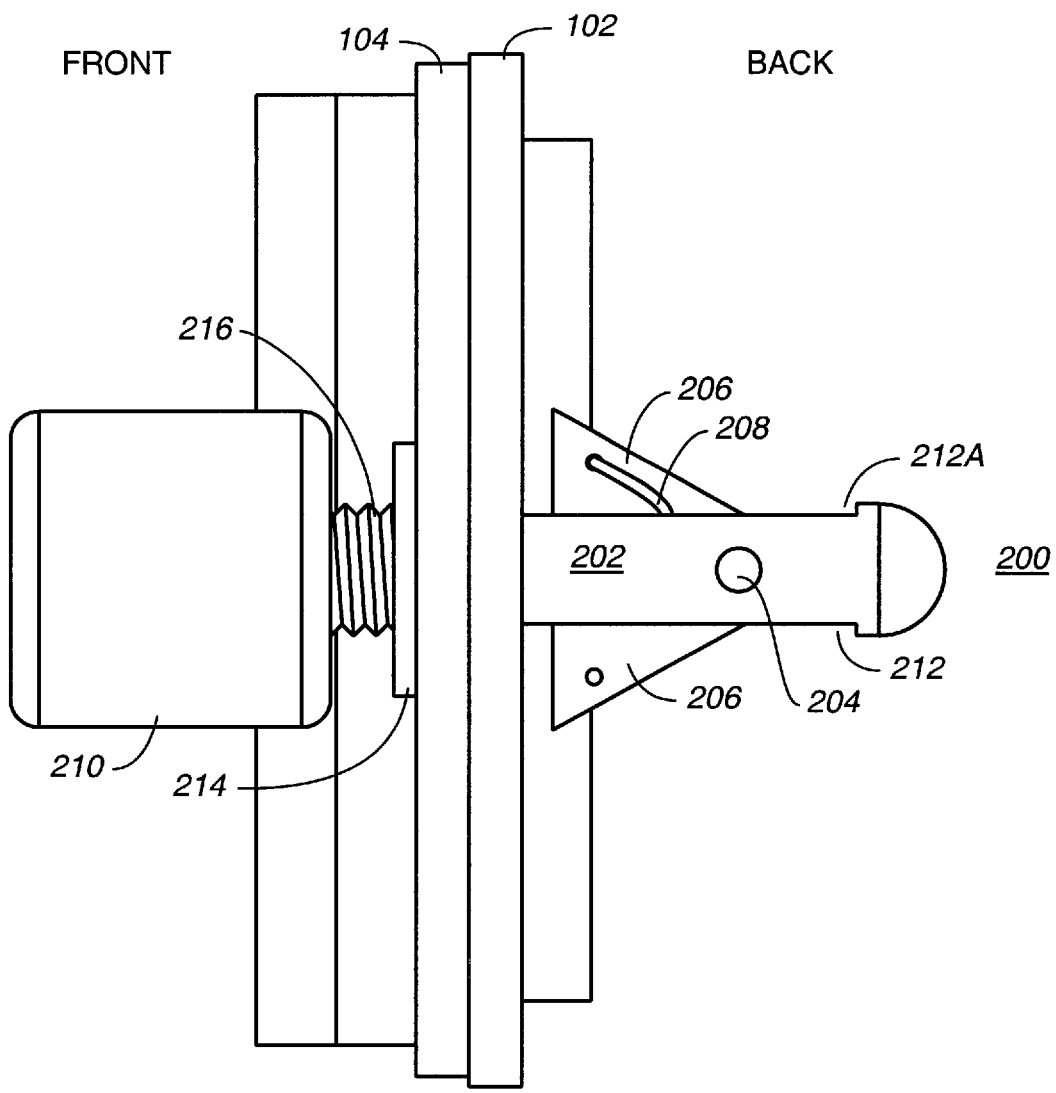
FIG._2

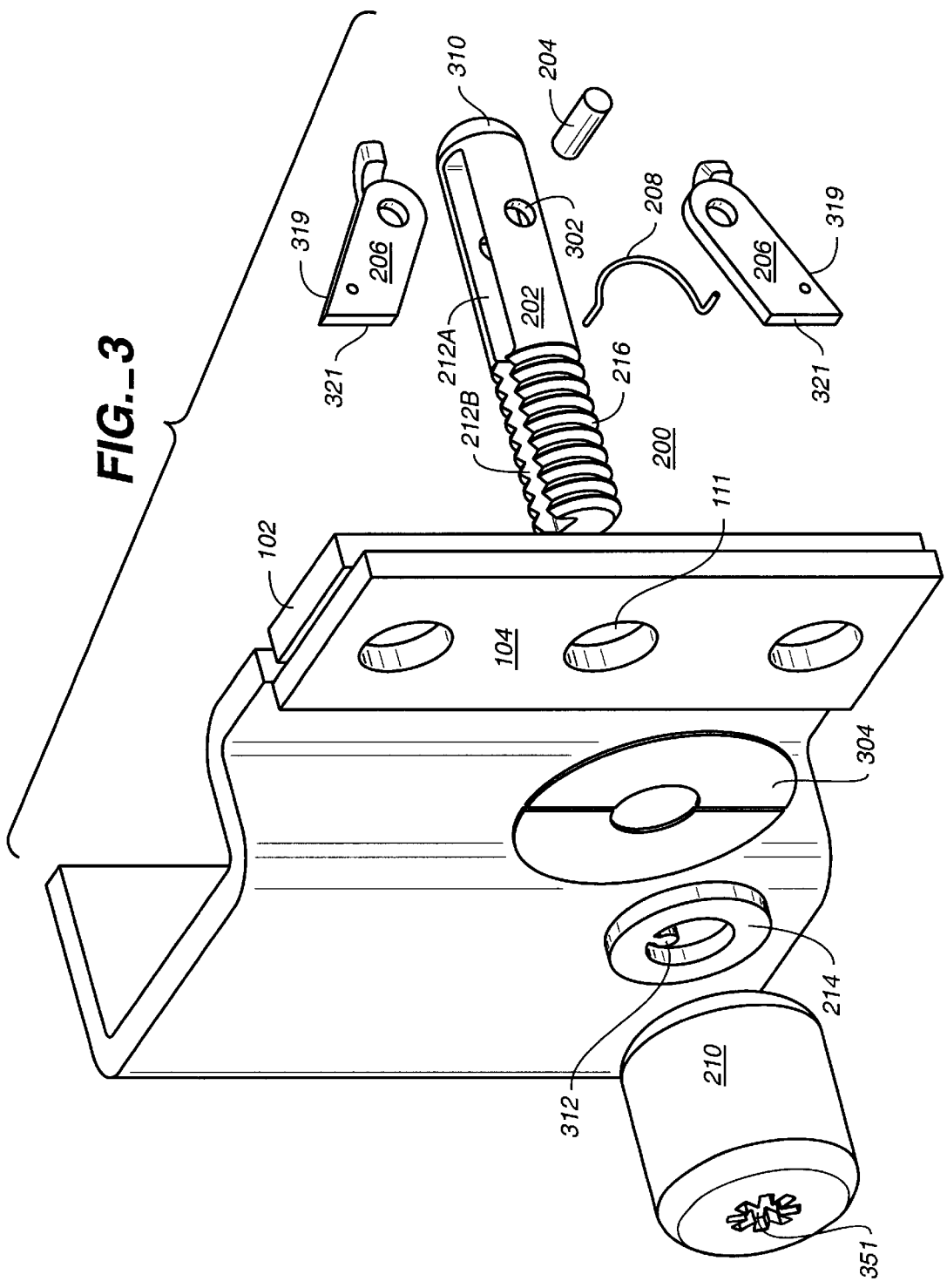

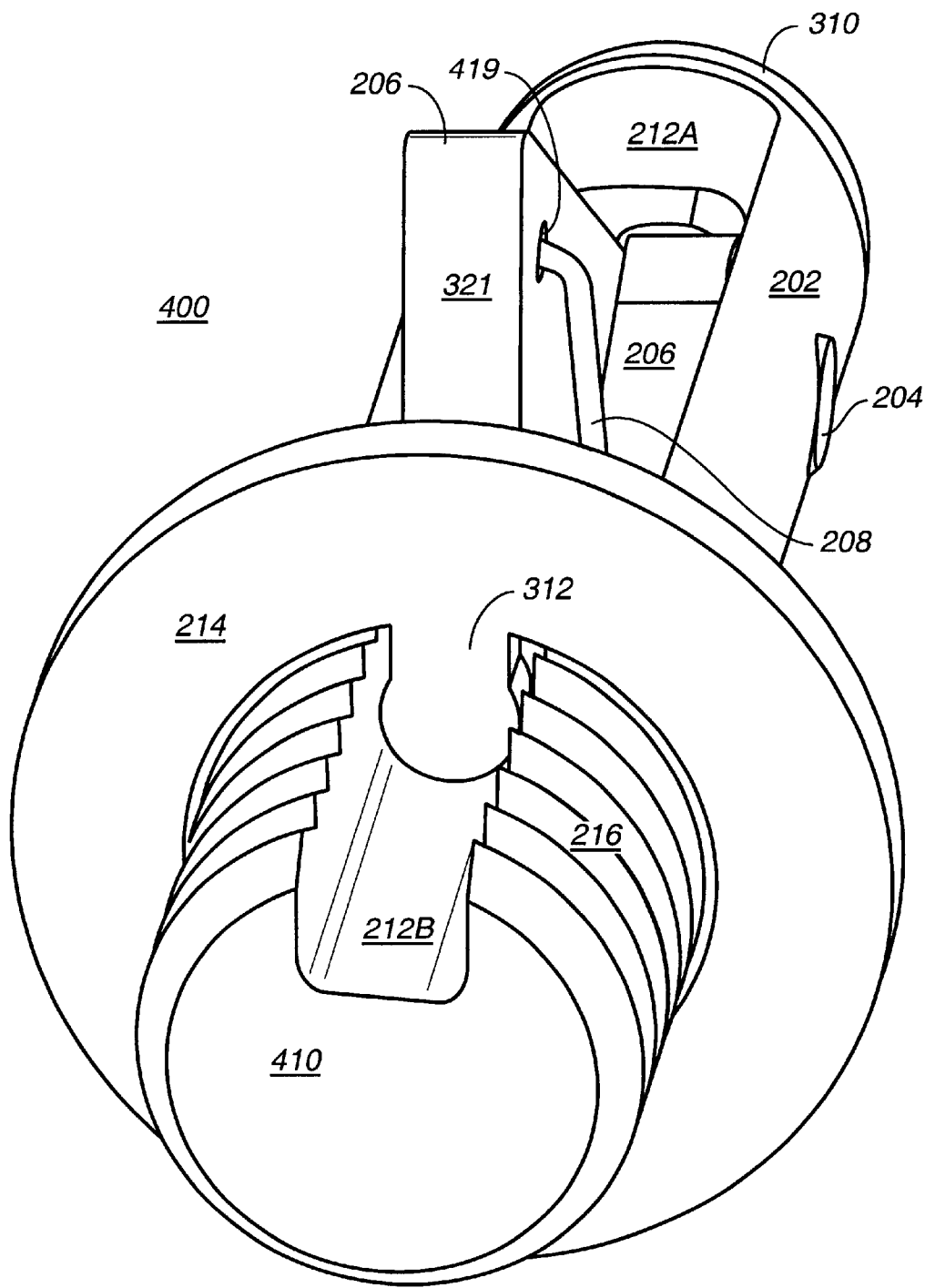
FIG._4

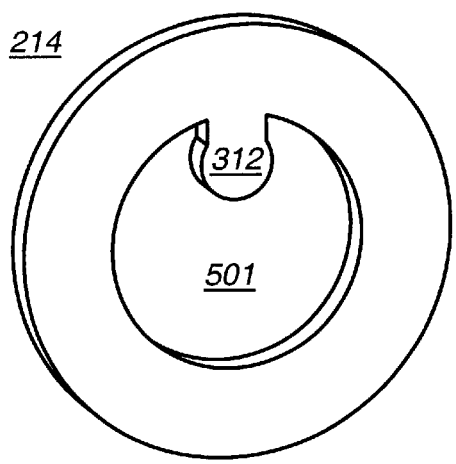
FIG._5A
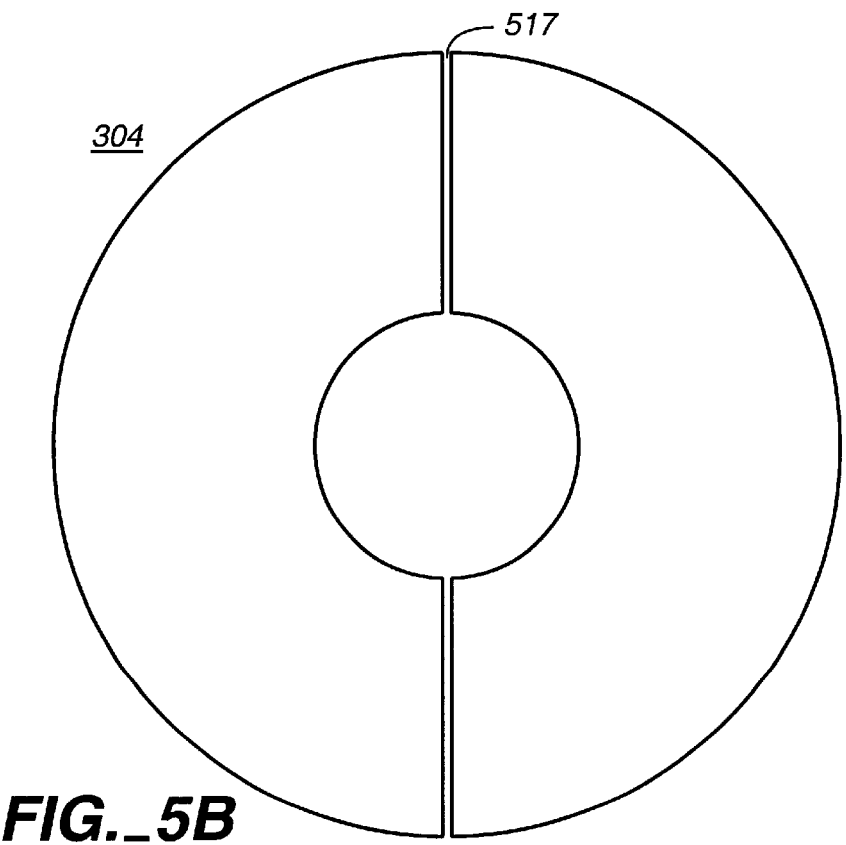
FIG._5B

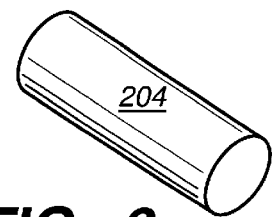
FIG._6
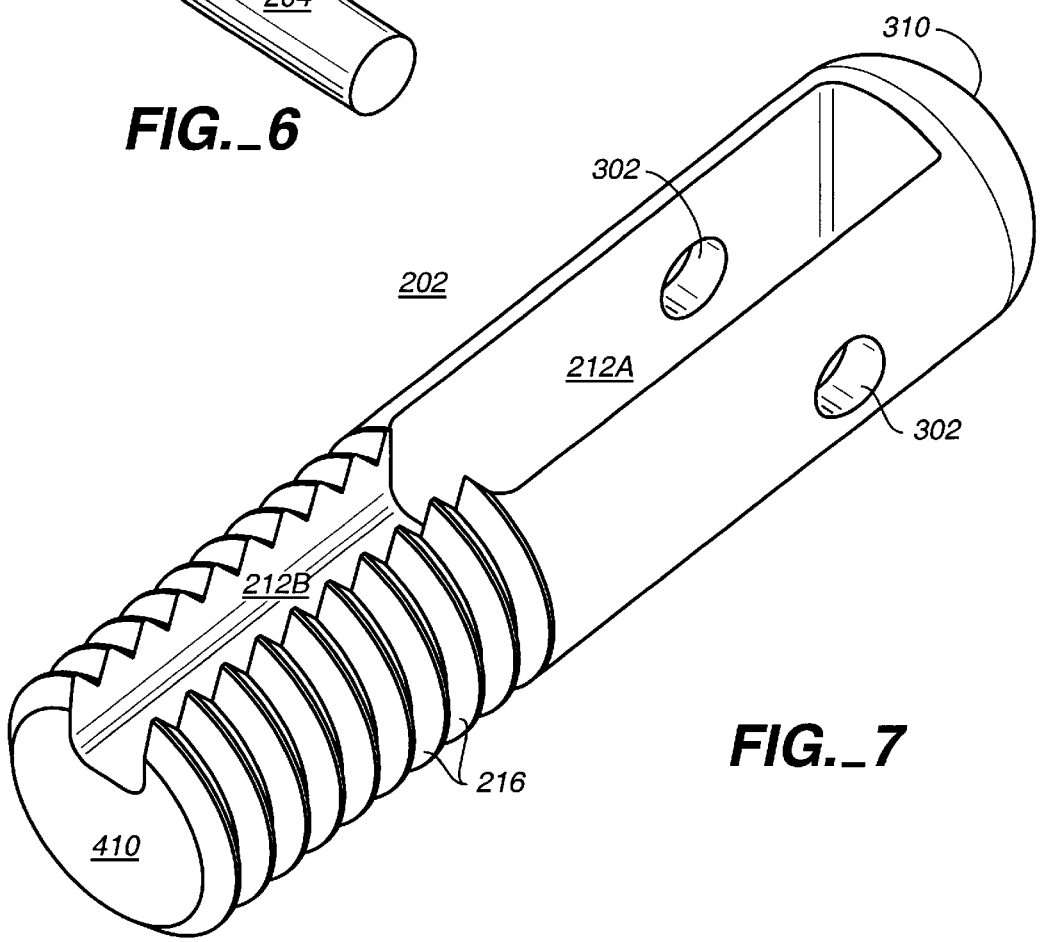
FIG._7
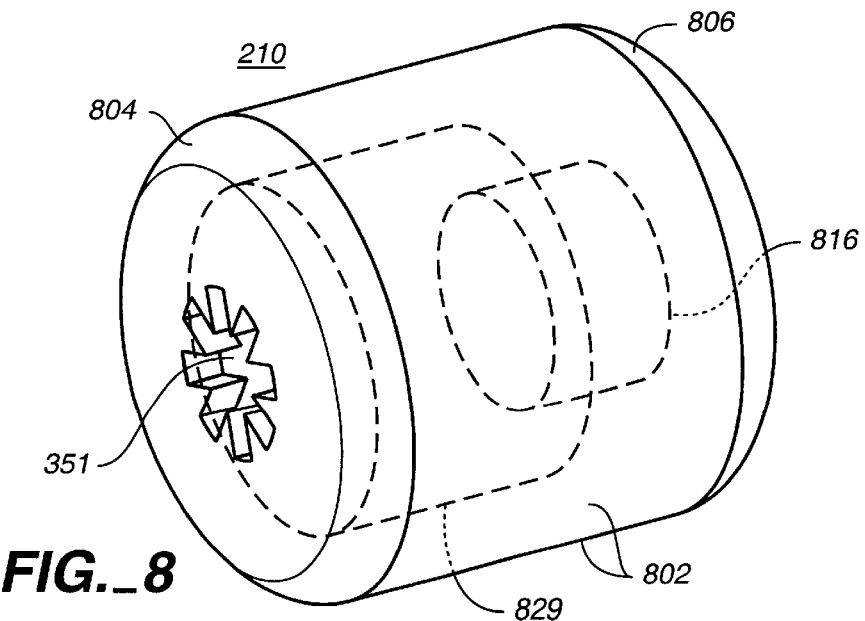
FIG._8

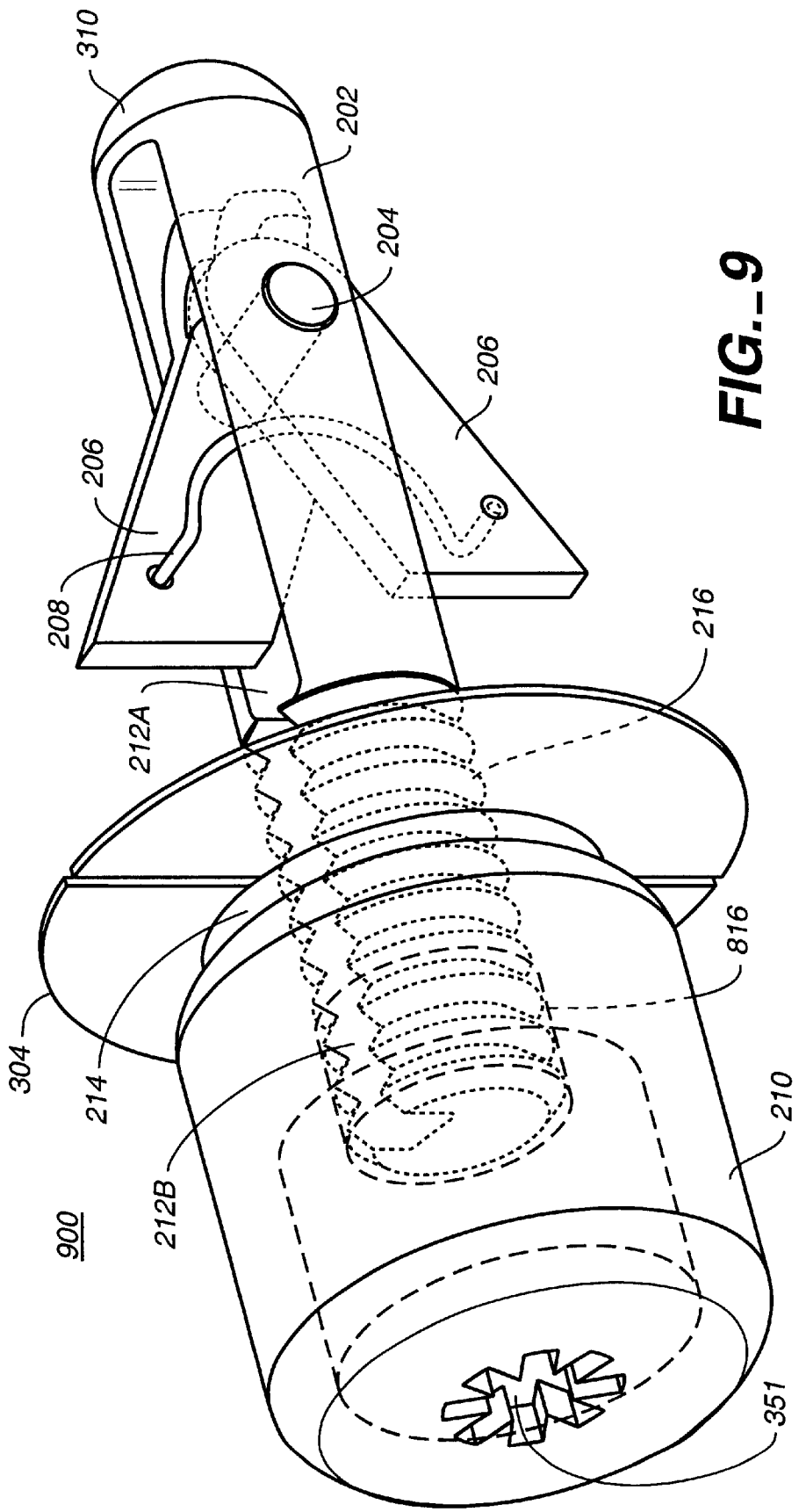
FIG._9

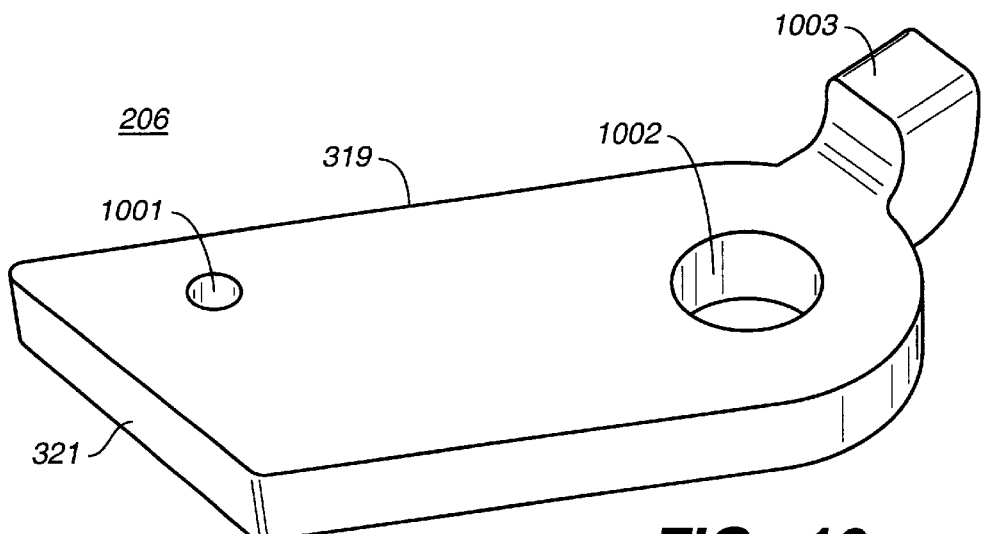
FIG._10
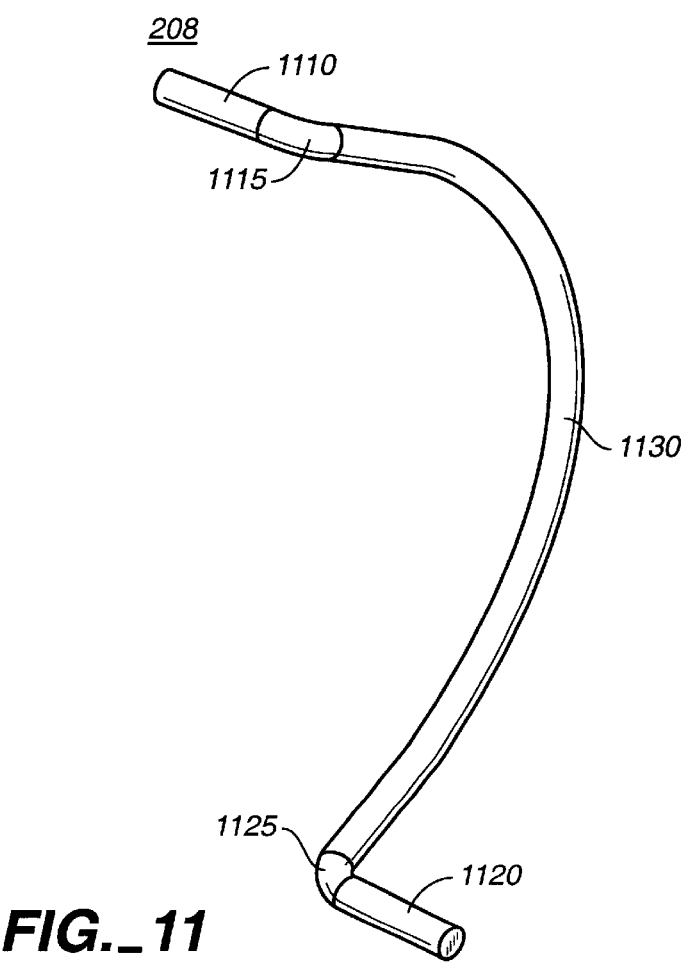
FIG._11

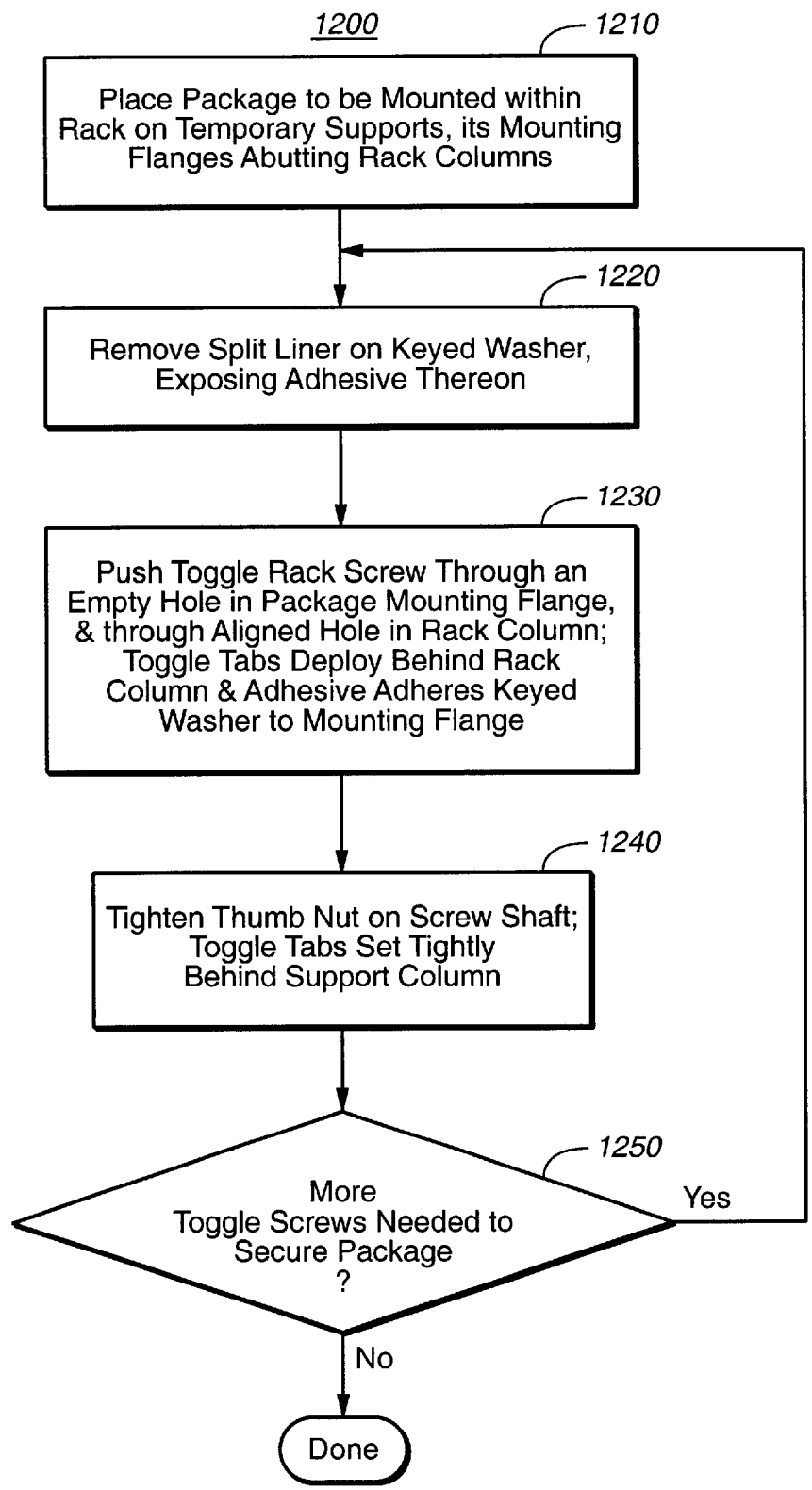
FIG._12

TOGGLING FASTENING DEVICE

TECHNICAL FIELD

Embodiments of the present invention relate to the field of fasteners. Specifically, embodiments of the present invention relate to a toggling fastening device.

BACKGROUND OF THE INVENTION

Electronic and instrumentation equipment is often deployed in chassis-mounted packages. Illustratively, servers, data storage units, and network components, to name some such electronic equipment, are often deployed in this chassis-mounted configuration. Chassis mounting makes centralizing the location of servers, storage units, network components, and other electronic equipment convenient because stationary and semi-stationary racks, cabinets, cubicles, and similar structures exist for housing such electronic equipment.

Conventionally, chassis-mounted electronic packages are installed in racks and similar structures using screws threaded into nuts of various types, including, for example, clip nuts. Clip nuts or other nuts are typically installed on columns and similar support structures within the racks and other structures. One typical rack design has four such columns running vertically. The columns have holes punched into them, through which bolts and other mounting hardware items pass, which are then threaded into the clip nuts or other nuts mounted behind the hole. Electronic packages are typically mounted horizontally, supported via their own flanging on the rack columns by screws penetrating both the flange and the column, threaded to sufficient tightness into the clip nuts or other nuts.

Various designs exist for clip nuts and other nuts. Many nut designs are quite familiar. Typically, a clip-held nut is affixed to the columns by spring tension or similar holding force exerted by a part of the clip. The clip nuts are all installed before an electronic package can be installed. One major task of installation guides for electronic equipment and their rack mounts as well as various product and technical documentation is to inform the installer where the clip nuts need to be located on the four columns of a mounting rack to satisfactorily install the electronic package.

There are some problems that can arise with installing or moving an electronic or similar package within a rack or similar structure using conventional clip nuts. One problem that can occur in such installations is that one or more of the clips are installed incorrectly. Illustratively, the clip nut can be installed in the wrong hole in the rack column, perhaps offset by as little as a single space. With reference to Prior Art FIG. 1, a chassis mounted package is to be mounted through its flange 104 to rack column 102, into which holes 110, 111, and 112 have been punched, drilled, etc. A clip screw 106 is affixed over hole 110. A bolt 108 is pushed through hole 109 in flange 104 so as to support the chassis-mounted package. The path 115 of bolt 108 passes through hole 111 for a properly aligned mounting. However, the clip nut is not in the correct position to secure the bolt 108. Thus, it is misaligned.

Such a problem can occur with troubling frequency, even with trained, experienced users. It is easy to see why-one common rack design has 1,968 holes punched into its columns for mounting packages therein, each hole approximately one inch from the next. This particular problem can be frustrating for users. When it occurs, the electronic package must be removed, the clip nut must be repositioned, and the package reinstalled and its mounting screws tightened, hopefully each now in a correctly positioned clip nut.

To remove clip nuts for repositioning, other problems can arise. When clip nuts must be repositioned, a tool and some amount of force must be brought to bear. Sometimes, the clip nut may fall within the rack or other enclosure. Upon falling, they can encounter electrical connections and cause an electrical fault such as a short or ground. Also upon falling, they can damage equipment such as ventilating fan blades, exposed delicate components in packages mounted beneath them, and/or other items. Further, upon falling a clip nut can become lost on the floor of the rack or other enclosure, which may be cluttered with cables, conductor bundles, and the like. Further still, clip nuts have somewhat sharp edges that can cause injury to a user attempting to remove and/or reposition a balky one.

Clip nuts themselves have costs associated with their procurement, such that losing them is wasteful. Over and above the cost of losing and replacing clip nuts however are other associated costs, such as users' labor costs and costs of delays associated with their repositioning and/or replacement efforts, costs associated with damage caused by their fall, and the human, temporal, and monetary costs associated with injuries caused thereby.

Conventionally, possible problems with using clip nuts for mounting electronic and other packages in racks and other enclosures have been addressed in several ways. First, newer clip nuts have been designed to improve their ease of use. However, even such improved clip nuts are subject to initial and subsequent mis-positioning, dropping, and loss. A second conventional solution has been to thread, rather than punch, each and every one of the plethora of holes in the columns of the racks or other enclosures, such that bolts and other mounting hardware items can be secured directly into the threaded holes. However, this is expensive. A third conventional alternative is to use only enclosures such as two-post racks, which often come with pre-threaded holes in their support columns. However, this precludes selecting other racks, which may be preferable (or even required) in a specific application. Hence, conventional approaches to mounting electronic and similar packages in racks and other enclosures are found somewhat wanting.

SUMMARY OF THE INVENTION

A fastening device is disclosed. The fastening device has a slotted shaft, a toggling mechanism, which deploys from within the slotted shaft, and which is adapted to couple the slotted shaft to a supporting structure, a detent mechanism disposed about the slotted shaft to deter its rotation, and a tightening mechanism adapted to couple to the shaft. The tightening mechanism binds the fastening device securely in place.

BRIEF DESCRIPTION OF THE DRAWINGS

Prior Art FIG. 1 depicts conventional clip nut mounting, illustrating a common misalignment problem.

FIG. 2 depicts a toggle screw assembly in situ, according to one embodiment of the present invention.

FIG. 3 is an exploded view of the toggle screw of an embodiment of the present invention.

FIG. 4 depicts a partial view of an assembled toggle screw assembly, according to one embodiment of the present invention.

FIG. 5A depicts a keyed washer of a toggle screw assembly, in accordance with an embodiment of the present invention.

FIG. 5B depicts an adhesive-covering liner, in accordance with an embodiment of the present invention.

FIG. 6 depicts a press-fit pin, in accordance with an embodiment of the present invention.

FIG. 7 depicts a screw shaft with a key slot and an open slot, in accordance with an embodiment of the present invention.

FIG. 8 depicts a thumb nut according to one embodiment of the present invention.

FIG. 9 is a cutaway view of a toggle screw assembly, according to one embodiment of the present invention.

FIG. 10 depicts a holder tab according to an embodiment of the present invention.

FIG. 11 depicts a spring according to an embodiment of the present invention.

FIG. 12 is a flowchart of the steps in a process for mounting an electronic chassis in a rack using a toggle screw, in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known methods, procedures, and components have not been described in detail so as not to unnecessarily obscure aspects of the present invention. Embodiments of the present invention are discussed primarily in the context of a toggling fastening device.

A toggling fastening device is described herein. In one embodiment, the fastening device has a slotted shaft, a toggling mechanism, which deploys from within the slotted shaft and which is adapted to couple the shaft to a supporting structure, and a tightening mechanism adapted to couple to the shaft. The tightening mechanism binds the fastening device securely in place. In one embodiment, the shaft is a partially threaded shaft having an open slot cut partially through its longitudinal axis. The toggling mechanism is ensconced within an open slot cut into the shaft during installation until the shaft penetrates holes in the mounting flange of the package and in the supporting structure, whereupon a spring provides a force to deploy the toggles into the operational position. An adhesive-backed keyed washer prevents the shaft from turning as the tightening mechanism is tightened.

Therefore, the need for conventional fasteners can be dispensed with for mounting electronic and similar packages in racks and other enclosures. Embodiments of the present invention allow fasteners to quickly and safely mount packages in enclosures without the possible alignment problems that can occur with conventional mounting fasteners.

In one embodiment, a toggling fastening device such as a toggle rack screw can be applied to fastening and/or securing electronic and other packages via their mounting flanges in a rack or other enclosure. However, the present embodiment is not limited to use with electronic packages but rather can be applied to a large number of fastening applications. It is appreciated that an embodiment of the present invention can be applied to fastening other and different kinds of flange-supported chassis in a variety of rack bearing enclosures.

Certain portions of the detailed descriptions of embodiments of the invention, which follow, are presented in terms of processes and methods (e.g., process 1200 of FIG. 12). Although specific steps are disclosed herein describing the operations of these processes and methods, such steps are exemplary. That is, embodiments of the present invention are well suited to performing various other steps or variations of the steps recited in the flowcharts of the figures herein.

With reference to FIG. 2, a fully assembled toggle screw device 200 is depicted from an in situ perspective. Toggle screw device 200 is deployed to mount a chassis-mounted electronic or similar package (not shown) via its mounting flange 104 to a rack column 102 or a similar structure, according to one embodiment of the present invention. A threaded screw shaft 202, into which an open slot 212A and a key slot 212B are cut, penetrates both mounting flange 104 and rack column 102. A set of tabs 206, deployed by a spring 208 from a press fit pin 204 that penetrates screw shaft 202 perpendicular to its longitudinal axis and key slot 212, secure mounting flange 104 to rack column 102 from the rear. Tabs 206 are ensconced within open slot 212A prior to their deployment to operational position. A thumb nut 210, threaded to complementarily match the threading 216 of screw shaft 202, tightens the toggle screw device 200 from the front. A keyed, adhesive-backed washer 214 prevents rotation of screw shaft 202 during tightening.

Referring now to FIG. 3, an exploded view of the toggle switch device 200 is depicted. A hole 111 penetrates both mounting flange 104 and rack column 102. Screw shaft 202, into which key slot 212B and open slot 212A are cut, is designed to penetrate hole 111. As screw shaft 202 is pushed through hole 111 from rounded end 310, toggle tabs 206 are ensconced in open slot 212A; their outer edges 319 can slide against the inner edge of hole 111, holding them in their ensconced position.

Once screw shaft 202 is pushed far enough through hole 111 for toggle tabs 206 to clear the inner surfaces of hole 111, spring 208 exerts a force upon toggle tabs 206 to deploy them into their extended position. Toggle tabs 206 pivot on and are supported by press fit pin 204, which is mounted in hole 302 through screw shaft 202, perpendicular to its longitudinal axis. Deployed in their extended position, the end surfaces 321 of toggle tabs 206 can brace against the back of column 102 to anchor toggle screw assembly 200 and thereby secure a chassis-mounted electronic or other package via its mounting flange 104 in a rack or similar structure.

A thumb nut 210 is threaded to complement the threading 216 on screw shaft 202. Thumb nut 210 is threaded onto screw shaft 202 and tightened so as to function as a tightening mechanism, fastening toggle screw 200 tightly, and thus securely mounting the package via its mounting flange 104 by drawing the end edges 321 of toggle tabs 206 tightly against the back of column 102. An adhesive-backed keyed washer 214 is affixed in position by adhering to mounting flange 104 and key 312 engages key slot 212.

An adhesive-covering liner (e.g., backing) 304 adheres to the adhesive-coated side of keyed washer 214 until the liner is removed at the time of installation of the fastener device. A slit 517 is cut in the adhesive exposure preventive material to effectuate peeling the material off the adhesive at the time of use. In one embodiment, liner 304 is oversized with respect to the keyed washer 214. Slit 517 and oversizing liner 304 with respect to keyed washer 214 advantageously facilitate ease of removal by users. Oversizing also reminds users to remove the liner 304 during installation of the fastener.

This allows a user to push on screw shaft 202 and tighten thumb nut 210 without screw shaft 202 turning and thus without toggle tabs 206 "skipping" behind rack column 102. The adhesive backing of keyed washer 212 sticks to the mounting flange 104 of the electronic package. Adhesive-backed keyed washer 214 functions as a detent mechanism to deter rotation of shaft 202 as the thumb nut 210 is tightened.

FIG. 4 depicts a more detailed view of a partially assembled toggle screw device 400, viewed from the front end 410 of screw shaft 202, opposite from end 310. Keyed washer 214 is positioned part way down the threading 216 with its key 312 positioned within key slot 212B. The front surface 321 of one toggle tab 206 is shown, with spring 208 deploying the toggle tab 206 out of key slot 212. The opposite end of the other toggle tab 206 is shown. One end of pin 204, upon which toggle tabs 206 pivot and derive tab 206-to-screw shaft 202 mounting is also shown.

FIG. 5A depicts keyed washer 214 by itself. Key 312 protrudes from keyed washer 214 into a hole 501 therein. FIG. 5B depicts an adhesive-covering liner 304. Adhesive-covering liner 304 covers the adhesive which adheres to keyed washer 214, protecting its cleanliness and stickiness until the adhesive is affixed to a surface (e.g., the front surface of mounting bracket 104). Liner 304 can be glassine or similarly smoothed paper, cellulose, plastic, or plastic-covered paper, or a similar material that will adhere to the adhesive to prevent exposure of the adhesive until it ready to be used, but is easily removable therefrom at installation time. A slit 517 is cut in the adhesive exposure preventive material to effectuate peeling the material off the adhesive at the time of use. Adhesive-backed keyed washer 214 functions as a detent mechanism to deter rotation of the fastener device (e.g., fastener device 200; FIGS. 2, 3) as the thumb nut 210 is tightened. The adherence of adhesive-backed keyed washer 214 to the mounting flange keeps the keyed shaft 202 (FIGS. 2, 3, 4) aligned in a set position while a tightening device (e.g., thumb nut 210; FIGS. 2, 3) is tightened to secure the package being mounted.

FIG. 6 depicts a pin 204, upon which toggle tabs 206 pivot and derive mounting to the screw shaft (e.g., screw shaft 202; FIGS. 2, 3, 4). Pin 204 can be any sufficiently strong material compatible with screw shaft 202, such as steel, stainless steel, aluminum, brass, etc. Pin 204 is designed to press-fit in one embodiment into hole 302 (FIGS. 3, 7) in screw shaft 202.

The screw shaft 202 is depicted alone in FIG. 7. Screw shaft 202 can be any sufficiently strong material compatible with the mounting structures (e.g., flange 104 and column 102), such as steel, stainless steel, aluminum, brass, etc. A key slot 212B is cut along the longitudinal axis of the screw shaft 202 from the front end 410 through the threaded section 216. An open slot 212A is cut through shaft 202 from the point at which key slot 212B and threaded section 216 to the end of shaft 202.

Open slot 212A cuts all the way through screw shaft 202 in one embodiment along its non-threaded portion to effectuate deployment of the toggle tabs 206 (FIGS. 2, 3, 4, 9,10) into the operational (e.g., mounting) position and to ensconce toggle tabs 206 during assembly (e.g., as the toggle fastener device is pushed through the holes in the mounting flange and support column). In one embodiment, key slot 212B cuts only part way through threaded section 216.

Pin 204 (FIGS. 2, 3, 4, 6) on which tabs 206 pivot and mount to screw shaft 202 is, in one embodiment, press-fitted into holes 302. Holes 302 penetrate screw shaft 202 perpendicular to its longitudinal axis.

FIG. 8 depicts thumb screw 210. The longitudinal circumference 802 of thumb screw 210 can be knurled. Beveled surfaces 804 and 806 can, in some embodiments, taper from the longitudinal circumference down to flattened outer and inner ends respectively. A recess 351 in the outer end of thumb screw 210 can be added in some embodiments to allow thumb screw 210 to be tightened by a screw driver, torx driver, or the like. A recess 816 on the inner end of thumb screw 210 is threaded complementarily to the threading 216 on the end of the screw shaft 202 (FIGS. 2, 3, 4). Thumb screw 210 may, in some embodiments, have a hollow recess 829 within.

FIG. 9 depicts a cut-away view of a fully assembled toggle screw device 900, according to one embodiment. A threaded screw shaft 202, into which an open slot 212A is cut, penetrates both mounting flange 104 and rack column 102. A set of tabs 206, deployed by a spring 208 from a press fit pin 204 that penetrates screw shaft 202 perpendicular to its longitudinal axis and open slot 212A, secure mounting flange 104 to rack column 102 from the rear. A thumb screw 210, threaded to complementarily match the threading 216 of screw shaft 202, tightens the toggle screw device 200 from the front. A keyed washer 214 prevents rotation of screw shaft 202 during assembly, mounting, and tightening when used in combination with an adhesive backing 304. Threads in a recess 816 in thumb screw 210 mate complementarily with the threading 216 at the end of screw shaft 202 opposite from back end 310. Toggle tabs 206 are shown in their fully-deployed position.

A toggle tab 206 is depicted alone in FIG. 10. Toggle tab 206 has a hole 1002, which fits over a press fit pin 204, on which it pivots and by which it is supported within screw shaft 202 (FIGS. 2, 3, 4). A detent pin 1003 protrudes substantially perpendicularly from the pivoting end of each toggle tab 206 to catch onto the detent pin 1003 protruding from the opposite toggle tab 206 and prevent the toggle pins 206 from moving beyond their fully-deployed position. A recess or hole 1001 into which an end of spring 208 (FIGS. 2, 3, 4,11) fits is positioned close to the end 321 of toggle tab 206 opposite from the pivoting end. This allows spring 208 to provide force on toggle tab 206 to effectuate its deployment into its extended position. When being pushed through hole 111 in flange 104 and column 102, toggle tab 206 is ensconced within open slot 212A in screw shaft 202 (FIGS. 2, 3, 4).

Spring 208 is depicted alone in FIG. 11. One end 1110 fits into a hole 1001 in toggle tab 206 to provide force to deploy the tab, while the opposite end 1120 fits into the corresponding hole 1001 in the opposing toggle tab 206 (FIG. 10). The main body 1130 of spring 208 is slightly curved in one embodiment, and transitional sections 1115 and 1125 turn the ends 1110 and 1120 respectively out perpendicularly from the main body 1130 of spring 208. Spring 208 can be made of any material of sufficient springiness, durability, hardness, toughness, and compatibility with toggle tabs 206 and shaft screw 202 to perform effectively in the particular toggle screw device design into which it is assembled.

One embodiment of the present invention provides a method of fastening a package having a mounting flange penetrated through by a hole in an enclosure having a support structure penetrated by a hole. The package is placed inside the enclosure such that its mounting flange abuts the support structure and such that the hole in the mounting flange is aligned with the hole in the support structure. The support structure can be, for instance, a support column in a rack or other enclosure for electronic or similar equipment. Each hole is penetrated with a fastener shaft such that the fastener shaft ensconces a pair of tabs and such that the tabs deploy from within the fastener shaft upon clearing both holes. Rotation of the shaft is deterred and a tightening mechanism is tightened, such that the tightening mechanism draws an edge of each of the pair of tabs into contact with the support structure, thus securing the package within the enclosure. An exemplary implementation of this method is described by reference to FIG. 12.

FIG. 12 is a flowchart describing a process 1200 for deploying a toggle fastener device (e.g., toggle screw devices 200, 900; FIGS. 2, 9, respectively) to secure a chassis-mounted electronic or other package within a rack or similar enclosure.

Process 1200 begins with step 1210, wherein a package to be mounted, such as a server, data storage unit, networking switch, or another electronic or other device is placed within a rack or other enclosure. The package can be placed on temporary supports, such as pins protruding from the rack columns. The package is placed so that its mounting flanges abut the rack columns.

In step 1220, an adhesive backing is exposed on a keyed washer, such as by removing a split adhesive-covering liner.

In step 1230, the toggle rack screw device is pushed through an empty hole in the package's mounting flange. It is also pushed through an aligned hole in the rack column. Advantageously, the toggle rack screw device can be used to align the holes in the package mounting flange with the holes in the rack column. Upon the open slot of the screw shaft partially clearing the column rack, its toggle tabs deploy into their open position behind the rack column by a spring-exerted force. The adhesive-backed keyed washer adheres to the mounting flange, its key within the key slot of the slotted shaft.

In step 1240, a thumb nut is tightened, drawing in on complementary threading on the shaft. In one embodiment, the thumb screw can be tightened with a tool such as a screw driver, a torx driver, or a similar tool via a recess thereon. In one embodiment, the thumb screw can be torqued to a specified torque requirement. The toggle tabs on the toggle shaft fastener device set tightly behind the support column to secure the package being mounted.

In step 1250, it is decided whether additional toggle screw devices are needed to properly install the package and secure it in place within the rack or other enclosure. If it is decided that additional toggle screw devices are needed to secure the package, then process 1200 loops back to step 1220 and repeats. Upon deciding that no additional toggle screw devices are needed to secure the package, process 1200 is complete.

In one embodiment, a toggle rack screw can be applied to fastening and/or securing electronic and other packages via their mounting flanges in a rack or other enclosure. However, the present embodiment is not limited to use with electronic packages but rather can be applied to a large number of fastening applications. It is appreciated that an embodiment of the present invention can be applied to fastening other and different kinds of flange-supported chassis in a variety of rack bearing enclosures.

In summary, a toggling fastening device is disclosed. The fastening device has a slotted shaft, a toggling mechanism, which deploys from within the slotted shaft and which is adapted to couple the shaft to a supporting structure, and a tightening mechanism adapted to couple to the shaft. The tightening mechanism binds the fastening device securely in place. In one embodiment, the shaft is a partially threaded shaft having an open slot cut partially through its longitudinal axis. The toggling mechanism is ensconced within the slot during installation until the shaft penetrates holes in the mounting flange of the package and in the supporting structure, whereupon a spring provides a force to deploy the toggles into the operational position. An adhesive-backed keyed washer prevents the shaft from turning as the tightening mechanism is tightened.

An embodiment of the present invention, a toggling fastening device, is thus described. While the present invention has been described in particular embodiments, it should be appreciated that the present invention should not be construed as limited by such embodiments, but rather construed according to the following claims and their equivalents.

What is claimed is:

1. A fastening device comprising:
   a slotted shaft having a slot cut through its longitudinal axis wherein a part of said slot completely penetrates a first part of the length of said shaft; and a threaded part coupled to said first part of the length of said shaft wherein said slot partially penetrates said threaded part;
   a toggling mechanism adapted to couple said shaft to a supporting structure wherein said toggling mechanism deploys from within said slotted shaft; and
   a tightening mechanism adapted to couple to said shaft wherein said tightening mechanism binds said fastening device securely in place.

2. The fastening device as recited in claim 1, wherein said toggling mechanism comprises:
   a pin disposed within said slotted shaft;
   a pair of tabs coupled to said pin wherein said tabs are deployable in opposite directions from within said slotted shaft and wherein pair of tabs are disposed to pivot about said pin; and
   a spring coupled to each of said pair of tabs wherein said spring is disposed to provide a force to deploy said pair of tabs in said opposite directions.

3. The fastening device as recited in claim 2, wherein said tabs are ensconced within said first part of said length of said shaft during a part of the period of installing said fastening device.

4. The fastening device as recited in claim 2, further comprising:
   a keyed washer; and
   an adhesive backing for said keyed washer wherein said adhesive backing affixes said keyed washer in an originally installed position and wherein said keyed washer and said adhesive backing function to deter rotation of said slotted shaft during tightening of said tightening mechanism.

5. The fastening device as recited in claim 1, wherein said affixing mechanism comprises a nut threaded complementarily with said threaded part.

6. The fastening device as recited in claim 5, wherein said nut comprises a thumb nut.

7. The fastening device as recited in claim 6, wherein said thumb nut is adapted to be tightened by a tool.

8. A device for fastening a package having a mounting flange penetrated by a hole in an enclosure having a support structure penetrated by a hole comprising:

a shaft having a slot cut through its longitudinal axis wherein a part of said slot completely penetrates a first part of the length of said shaft and a threaded part coupled to said first part of the length of said shaft wherein said slot partially penetrates said threaded part;

a pin disposed within said slotted shaft;

a pair of tabs coupled to said pin wherein said tabs are deployable in opposite directions from within said slotted shaft and wherein said pair of tabs are disposed to pivot about said pin;

a spring coupled to each of said pair of tabs wherein said spring is disposed to provide a force to deploy said pair of tabs in said opposite directions;

a tightening mechanism adapted to couple to said shaft wherein said tightening mechanism binds said fastening device securely in place; and a detent mechanism disposed about said shaft for deterring rotation of said device.

9. The fastening device as recited in claim 8, wherein said tabs are ensconced within said first part of said length of said shaft during a part of the period of installing said fastening device.

10. The fastening device as recited in claim 8, wherein said tightening mechanism comprises a nut threaded complementarily with said threaded part.

11. The fastening device as recited in claim 10, wherein said nut comprises a thumb nut.

12. The fastening device as recited in claim 11, wherein said thumb nut is adapted to be tightened by a tool.

13. The fastening device as recited in claim 8, wherein said detent mechanism comprises:

a keyed washer; and an adhesive backing for said keyed washer wherein said adhesive backing affixes said keyed washer in an originally installed position and wherein said keyed washer and said adhesive backing function to deter rotation of said slotted shaft during tightening of said tightening mechanism.

14. A method of fastening a package having a mounting flange penetrated by a hole in an enclosure having a support structure penetrated by a hole comprising:

placing said package inside said enclosure wherein said mounting flange abuts said support structure and wherein said hole in said mounting flange is aligned with said hole in said support structure;

penetrating each said hole with a fastener shaft wherein said fastener shaft ensconces a pair of tabs and wherein said tabs deploy from within said fastener shaft upon clearing said holes;

deterring rotation of said shaft; and tightening a tightening mechanism wherein said tightening mechanism draws a part of each of said pair of tabs into contact with said support structure.

15. The method as recited in claim 14, wherein said deterring comprises installing a keyed washer wherein said keyed washer keys into a slot within said fastener shaft and wherein said keyed washer adheres to said mounting flange.

16. The method as recited in claim 14, wherein said package is selected from the group consisting essentially of chassis-mounted electronics, electronic packages, servers, network equipment, data storage equipment, ion packages, and computer components.

17. The method as recited in claim 14, wherein said enclosure is selected from the group consisting essentially of racks, cabinets, cubicles, instrumentation containers, electrical switchgear, and computer frames.

* * * * *